United States Patent [19]
Bonnewitz

[11] Patent Number: 6,050,510
[45] Date of Patent: Apr. 18, 2000

[54] SWITCHING DEVICE FOR CUTTER BLADES IN AGRICULTURAL HARVESTING MACHINES

[75] Inventor: Bernard Bonnewitz, Vaux, France

[73] Assignee: Usines Claas France, Metz, France

[21] Appl. No.: 09/248,795

[22] Filed: Feb. 12, 1999

[30] Foreign Application Priority Data

Feb. 13, 1998 [DE] Germany ............................ 198 05 854

[51] Int. Cl.[7] .................................................. B02C 21/02
[52] U.S. Cl. .................................... 241/101.763; 56/14.3; 56/14.5; 241/287
[58] Field of Search ............................ 241/287, 101.763, 241/101.742; 56/14.3, 14.5

[56] References Cited

U.S. PATENT DOCUMENTS 4,728,046  3/1988  Bruer et al. ...................... 241/101.763

5,498,207  3/1996  Cappon et al. ................... 241/101.763

FOREIGN PATENT DOCUMENTS 43 02 199  7/1994  Germany .

*Primary Examiner*—Mark Rosenbaum
*Attorney, Agent, or Firm*—Husch & Eppenberger, LLC; Robert E. Muir

[57] ABSTRACT

The invention relates to an agricultural harvesting machine having a switching device for cutter blades for comminuting crop material before the pressing or gathering operation. It is particularly applicable for round and square baling presses as well as self-loading forage boxes. The essential characteristics of the invention are support strips, which are associated with pivot strips and attached to bearing sleeves, and a blocking rod which is arranged outside the pivot range of the support strips, extends across the whole width of the conveying channel and can be pivoted by an adjusting device into the working range of the support strips.

14 Claims, 3 Drawing Sheets

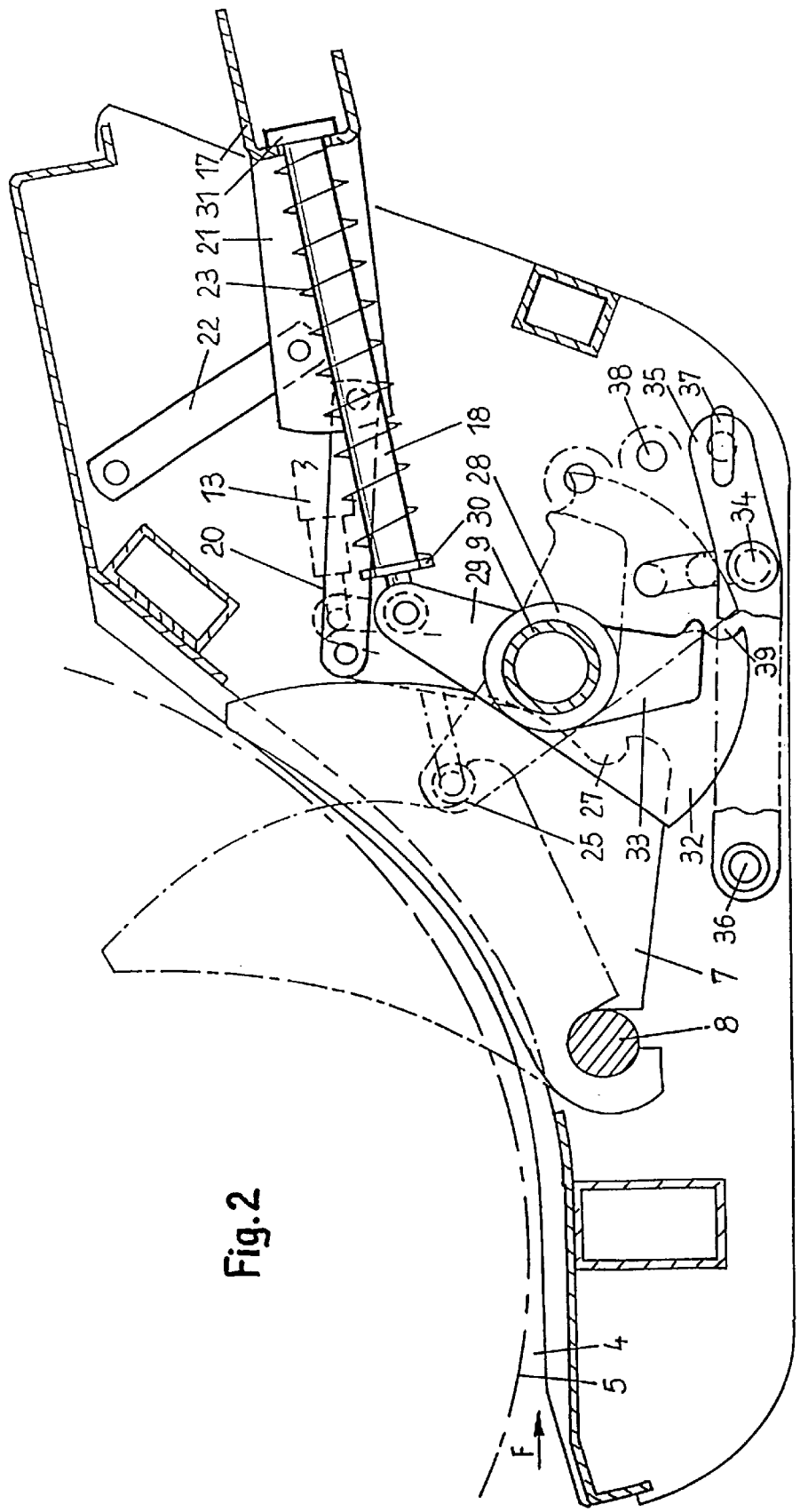

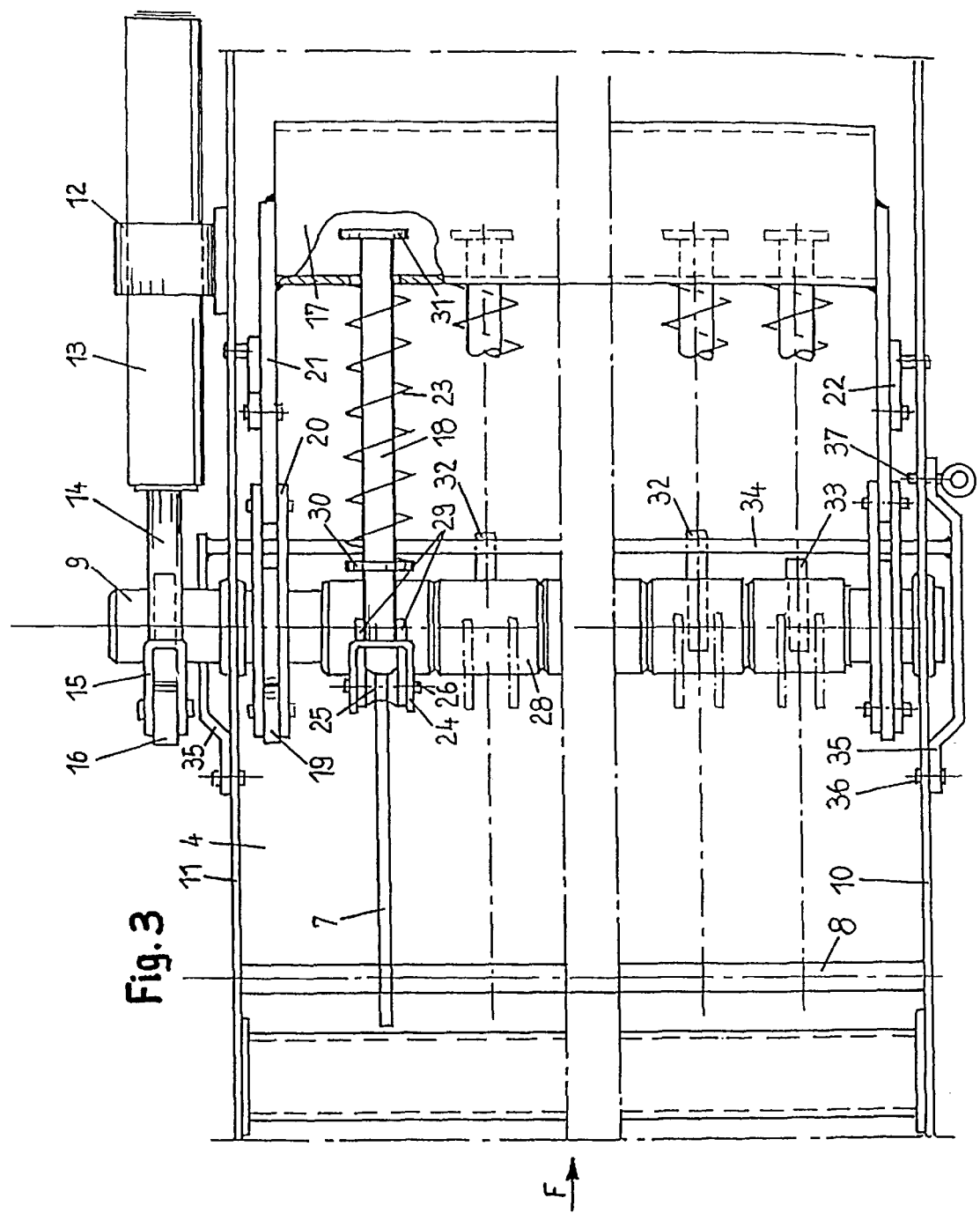

SWITCHING DEVICE FOR CUTTER BLADES IN AGRICULTURAL HARVESTING MACHINES

BACKGROUND OF THE INVENTION

The present invention relates generally to agricultural machinery and, more particularly, to improvements to agricultural harvesting machines.

The invention further relates to a switching device for cutter blades, which are used for comminuting crop material in agricultural harvesting machines, in particular for round and square baling presses as well as self-loading forage wagons.

Switching devices of this kind for optional operation of the number of operative cutter blades for comminuting crop material are well known in various designs on agricultural harvesting machines. For example, in German patent 43 02 199 C2 is shown a cutting device having a plurality of pivotably arranged cutter blades which are brought into the cutting position by hydraulically controllable support members and released from the support members completely or in an optional number for pivoting into a non-cutting position by means of a switching device. The support members are constructed as spring-loaded push rods which, from a central location, are brought into a working position where all the cutter blades are in the cutting position. Switching of individual cutter blades, groups of cutter blades or all cutter blades to the cutting position or the non-cutting position takes place from a second location. This second location cooperates with retaining elements for the individual push rods and is formed by a rotatable switching shaft with individual control cams for each cutter blade. Each push rod is connected to a controllable locking and unlocking rod for release and retention of the push rod and for switching the cutter blades to the cutting position or the non-cutting position. This known switching device fulfills the necessary functional conditions for the actuation of the cutter blades at any given time, but requires relatively high production and maintenance costs.

SUMMARY OF THE INVENTION

It is an object of the present invention to improve the switching device for the cutter blades.

In accordance with the present invention there is provided an agricultural harvesting machine having a switching device for cutter blades used to comminute crop material, a pick-up device, a subsequent conveying channel with a tine rotor, a plurality of pivotably arranged cutter blades which can be held in a preselected number in cutting and non-cutting positions, means for pivoting the cutter blades and including a hydraulic cylinder, a crossbeam, and a pivot device; a blocking device for optionally blocking the movement from the hydraulic cylinder to one or more cutter blades into the cutting position, and the blocking device comprising support strips of varying lengths associated with the cutter blades, and a blocking rod selectively engageable with the support strips.

The support strips of different length which are associated with cutter blades are advantageously attached to the pivot device of the cutter blades. Depending on the length of the support strips, the support strips can be blocked by means of the blocking rod. The construction makes it possible with the switching device to operate an optional number of operative cutter blades. Thus, it becomes possible to easily adapt the degree of comminution according to the type of crop material, its nature and its intended use. The advantageous structural solution results in simple, easy control as well as a functionally reliable manner of operation with comparatively low production and maintenance costs.

BRIEF DESCRIPTION OF THE DRAWINGS

Reference is now made to the drawings which illustrate the best known mode of carrying out the invention and wherein the same reference numerals indicate the same or similar parts throughout the several views.

FIG. 2 is a partial longitudinal sectional view of a switching device for the cutter blades; and FIG. 3 is a top view of the switching device.

DETAILED DESCRIPTION

Figure 1:
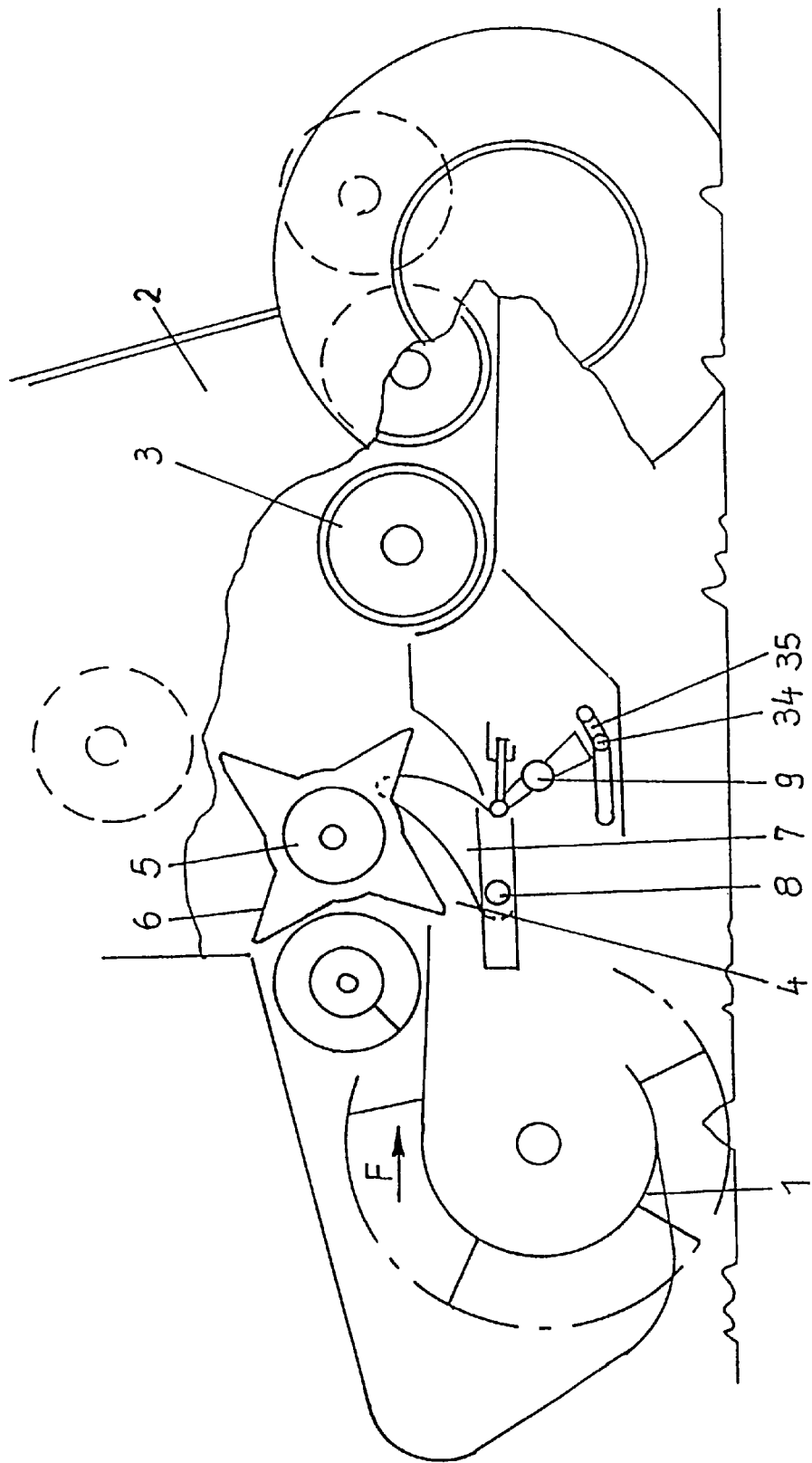
FIG. 1 is a schematic view of pick-up and cutting regions of a round baling press.

A round baling press is partially shown in FIG. 1 as one example of a harvesting machine. The crop material deposited in the field is fed to the baling press via a pick-up drum 1 and a cutting device to the pressing chamber 2. Several pressing rollers 3 are arranged at the circumference of the pressing chamber. The crop material first passes in a conveying channel 4 from the pick-up drum 1 to a tine rotor 5 whose individual tines 6 cooperate with cutter blades 7 arranged beneath the tine rotor 5 and comminute the crop material. The cutter blades 7 are arranged in a row and at a distance adjacent to each other across the entire width of the conveying channel 4. From the state of the art, however, a multiple-row arrangement of cutter blades is also known.

The degree of comminution of crop material required at any given time is determined by the number of cutter blades 7 which come into operation. The larger the number of operative cutter blades 7, the more the crop material is comminuted. For this purpose the cutter blades 7 are arranged so as to be all capable of pivoting completely, or an optional number of cutter blades 7 may be pivoted, about a shaft 8 extending across the whole width of the conveying channel 4 and into cutting and non-cutting positions.

A pivot shaft 9 is mounted rotatably on the side walls 10, 11 of the round baling press, outside the pivot range of and behind, relative to the direction of conveying F. the cutter blades 7. Adjacent to the side wall 11, a hydraulic cylinder 13 is attached to a pivotable support 12 and serves as a servo motor for pivoting the pivot shaft 9. Naturally mechanical, electrical or other servo motors can be used alternatively. The piston rod 14 of the hydraulic cylinder is pivotably connected by a fork portion 15 to a bar 16 rigidly attached to the pivot shaft 9. The pivot shaft 9 is further connected by a lever assembly to a crossbeam 17. A plurality of push rods 18, which are connected to the cutter blades 7, are attached to the crossbeam 17. Pivot strips 19 are rigidly mounted on both end regions of the pivot shaft 9. Articulated levers 20 are attached to the pivot shaft 9 as well. Thrust levers 21, in turn, are attached to the articulated levers 20. The thrust levers 21 are rigidly connected to the crossbeam 17. Push rods 18 with cooperating compression springs 23 are arranged, in the lateral spacing of the cutter blades 7, on the U-profiled crossbeam 17. Each push rod 18 simultaneously forms with its compression spring 23 an overload protection means which can be moved relative to the crossbeam 17. During pivoting of the pivot shaft 9 the crossbeam 17 is displaced by the hydraulic cylinder 13 relative to the cutter blades 7. Each push rod 18 comprises, at its cutter blade end, a fork 24 on which a pressure roller 25 is rotatably mounted on a shaft 26, abutting against the cutter blade 7. In the cutting position of the cutter blades 7, the pressure roller 25 is held in a fixing recess 27 on the cutter blade 7. The individual push rods 18 are pivoltably connected to a pivot bearing, which is freely movable about the pivot shaft 9. This pivot bearing consists of a bearing sleeve 28, which rotates about the pivot shaft 9, and two pivot strips 29 which are rigidly attached thereto at a distance and whose free ends on the shaft 26 are engaged by the fork 24 of the push rod 18. Each individual push rod 18 is connected to a separate pivot bearing.

A compression spring 23, which is supported at one end on the crossbeam 17 and at the other end on an abutment 30 connected to the push rod 18, is arranged around each push rod 18. At the crossbeam end the push rods 18 are provided with stops 31 which limit the movement in the direction of the cutter blades 7. The push rod 18 is entrained in the direction of the cutter blades 7 during the movement of the crossbeam 17 as a result of the action of the compression spring 23. In case of overloading of the cutter blades 7 as a result of foreign bodies entering the conveying channel 4, the cutter blades 7 are pivoted downwards into the non-cutting position and the push rods 18 concerned are pushed by the backward-pivoting cutter blades 7 in the direction of the crossbeam 17. After the foreign body has passed the cutter blade 7, the latter is automatically pivoted back into the cutting position by the compression spring 23 and the push rod 18.

Transmission of the movement of the hydraulic cylinder as a servo motor to one or more cutter blades 7, thereby moving the cutter blades 7 into a cutting position can optionally be blocked by means of the blocking device described below. In order to switch the individual cutter blades 7 to the required position at any given time, support strips 32, 33 are arranged on the bearing sleeves 28. The support strips 32, 33 are associated with the pivot strips 29, rigidly attached to the bearing sleeves 28 and offset from the pivot strips 29 by about 180 E. The support strips 32, 33 in the practical example have two different lengths, each length measurement being assigned to a given group of cutter blades 7. The number of different lengths can be adapted to the requirements of the particular machine. A blocking rod 34, extending for example across the whole width of the conveying channel 4, is arranged outside the pivot range of the support strips 32, 33. The blocking rod 34 can advantageously be pivoted by an adjusting device into the working range of the support strips 32, 33. However, the blocking rod 34 can also be introduced manually from outside into a support corresponding to the desired switching position, and can also be constructed in several parts. The blocking rod 34 is connected at both ends to pivot levers 35, which are pivotably mounted on shafts 36 on the side walls 10, 11, for pivoting into the working range of the support strips 32, 33. The free end of a pivot lever 35 can be fixed by means of a plug 37, which may be inserted in openings 38 on the side wall at three different height positions. When the pivot lever 35 is set in the lower position (FIG. 2), the blocking rod 34 is located outside the pivot range of the support strips 32, 33. Therefore, in this position free movement of the support strips 32, 33 about the pivot shaft 9 is possible, so that all the cutter blades 7 can be brought into the cutting position by the push rods 18. With the middle position setting of the pivot lever 35, the cutter blades 7 associated with the support strips 32 of longer length are not actuated. As the stop recesses 39 of the support strips 32 abut against the blocking rod 34, the movement of the push rods 18 in the direction of the cutter blades 7 is blocked. All the support strips 32, 33 abut against the blocking rod 34 in the upper position of the pivot lever 35, so that the associated cutter blades 7 cannot be pivoted into the cutting position. In this case only a small group of cutter blades 7 are actuated, namely only those whose associated pivot strips 29 are provided without support strips 32, 33.

All the cutter blades 7 are switched to the non-cutting position by means of the hydraulic cylinder 13. The retraction of the piston rod 14 causes the pivot shaft 9 to be rotated through a given angle. This rotation causes displacement of the crossbeam 17 in the direction of conveying F of the crop material. At the same time the push rods 18 are also moved against the spring force of the compression springs 23 away from the cutter blades 7. The pressure rollers 25 thus release the cutter blades 7 and the latter can automatically pivot about the shaft 8 downwardly into the non-cutting position. If all or an optional number of the cutter blades 7 are brought into the cutting position, the pivot lever 35 is set in the corresponding position and locked with the plug 37 to the side wall 10. Then the piston rod 14 of the hydraulic cylinder 13 is extended, thereby displacing the crossbeam 17 with the push rods 18 in the direction of the cutter blades 7. The pressure rollers 25 acting on the cutter blades 7 pivot the latter upwardly into the cutting position. Depending on the position of the pivot lever 35, all or only some of the push rods 18 are displaced forwardly to act on the cutter blades 7.

Other objects, features and advantages will be apparent to those skilled in the art. While preferred embodiments of the present invention have been illustrated and described, this has been by way of illustration and the invention should not be limited except as required by the scope of the appended claims.

I claim:

1. In an agricultural harvesting machine having a switching device for cutter blades used to comminute crop material, a pick-up device, a subsequent conveying channel with a tine rotor, a plurality of pivotably arranged cutter blades which can be held in a preselected number in cutting and non-cutting positions, means for pivoting the cutter blades and including a hydraulic cylinder, a crossbeam, and a pivot device; the improvement comprising:

a blocking device for optionally blocking the movement from the hydraulic cylinder to one or more cutter blades into the cutting position, the blocking device comprising support strips of varying lengths associated with the cutter blades, and a blocking rod selectively engageable with the support strips.

2. An agricultural harvesting machine according to claim 1, wherein said blocking rod is pivotable by an adjusting device into the working range of said support strips.

3. An agricultural harvesting machine according to claim 2, wherein the pivot device includes a plurality of bearing sleeves, and the support strips are attached to the bearing sleeves.

4. An agricultural harvesting machine according to claim 3, wherein the pivot strips are attached to the bearing sleeves, and said support strips are offset from the bearing sleeves by about 180 degrees.

5. An agricultural harvesting machine according to claim 1, wherein said support strips have different lengths, each length measurement being assigned to individual cutter blades.

6. An agricultural harvesting machine according to claim 1, wherein said support strips have different lengths, each length measurement being assigned to groups of cutter-blades.

7. An agricultural harvesting machine according to claim 1, wherein said blocking rod is connected at both ends to pivot levers which are pivotably mounted on the side walls.

8. An agricultural harvesting machine according to claim 7, wherein one of said pivot levers has a free end which is fixed by means of a plug in different height positions in openings on the side wall.

9. An agricultural harvesting machine having a switching device for cutter blades used for comminuting crop material,; the harvesting machine including a pick-up device; a subsequent conveying channel with a pronged rotor; a plurality of pivotably mounted cutter blades which can be held in a preselectable number in a cutting or non-cutting position; a plurality of bearing sleeves; means for pivoting the cutter blades including pivot strips mounted on the bearing sleeves; a blocking device for optionally blocking the movement of one or more of the cutter blades into a cutting position; the blocking device including support strips of different lengths attached to the bearing sleeves and associated with the cutter blades; and a blocking rod which, depending on the length of the support strips, is selectively engageable with the support strips.

10. An agricultural harvesting machine according to claim 9, wherein said blocking rod is pivotable by an adjusting device into the working range of said support strips.

11. An agricultural harvesting machine according to claim 9, wherein the support strips are offset from the bearing sleeves by about 180 degrees.

12. An agricultural harvesting machine according to claim 9, wherein said different length support strips have each length measurement assigned to individual cutter blades.

13. An agricultural harvesting machine according to claim 9, wherein said different length support strips have each length measurement assigned to groups of cutter blades.

14. An agricultural harvesting machine according to claim 9, wherein the harvesting machine has side walls, the blocking rod has ends, and including a pivot lever pivotally mounted on the side walls and connected to the ends of the blocking rod, the pivot lever having a free end which can be fixed by means of a plug in different height positions in openings on one of the side walls.

* * * * *